United States Patent
Ma

(10) Patent No.: US 12,279,076 B2
(45) Date of Patent: Apr. 15, 2025

(54) CLOUD STORAGE EXPANSION APPARATUS OF VIDEO RECORDER

(71) Applicant: Chia-Hung Ma, Kaohsiung (TW)

(72) Inventor: Chia-Hung Ma, Kaohsiung (TW)

(*) Notice: Subject to any disclaimer, the term of this patent is extended or adjusted under 35 U.S.C. 154(b) by 57 days.

(21) Appl. No.: 18/197,459

(22) Filed: May 15, 2023

(65) Prior Publication Data
US 2024/0340393 A1   Oct. 10, 2024

(30) Foreign Application Priority Data
Apr. 7, 2023   (TW) .................. 112203193

(51) Int. Cl.
| | |
|---|---|
| *G06V 20/58* | (2022.01) |
| *H04N 5/77* | (2006.01) |
| *H04N 5/907* | (2006.01) |
| *H04N 7/18* | (2006.01) |

(52) U.S. Cl.
CPC ............ *H04N 7/185* (2013.01); *G06V 20/58* (2022.01); *H04N 5/77* (2013.01); *H04N 5/907* (2013.01)

(58) Field of Classification Search
CPC . H04L 67/1097; H04L 63/105; H04L 63/102; H04L 63/0861; H04L 67/06; H04L 63/1425; H04L 63/1408; H04L 63/1416; H04L 67/306
USPC ............................................. 348/148
See application file for complete search history.

(56) References Cited

U.S. PATENT DOCUMENTS

| | | | |
|---|---|---|---|
| 9,307,217 B1* | 4/2016 | Day ................... | H04N 5/772 |
| 2014/0032718 A1* | 1/2014 | Berger ................ | H04L 67/06 |
| | | | 709/219 |

FOREIGN PATENT DOCUMENTS

WO   WO-2018070557 A1 *   4/2018   ......... H04N 21/2743

* cited by examiner

*Primary Examiner* — Masum Billah
(74) *Attorney, Agent, or Firm* — Birch, Stewart, Kolasch & Birch, LLP

(57) ABSTRACT

A cloud storage expansion apparatus for a video recorder is provided, wherein the cloud storage expansion apparatus comprises: a body having a circuit board, a flash card circuit unit, a dummy card connector, a wireless communication module, a detection module, and a controller electrically connected to the circuit board, wherein the dummy card connector is removably connected to a flash card slot of a video recorder and electrically connected to a communication interface of the flash card slot; the wireless communication module is connected to a cloud space; the detection module detects whether there is an active signal in the communication interface.

20 Claims, 6 Drawing Sheets

CLOUD STORAGE EXPANSION APPARATUS OF VIDEO RECORDER

FIELD OF TECHNOLOGY

The present invention relates to a storage expansion apparatus, and in particular to a cloud storage expansion apparatus for a video recorder.

BACKGROUND

For a plug-in video recorder product, such as a conventional driving recorder, has a good SONY-grade Complementary Metal Oxide Semiconductor (CMOS) photosensitive component for about USD $150~$200. Replacing the above apparatus would lead to a waste of life cycle on the original driving recorder. From an environmental protection perspective or a money perspective, for example, it costs tens of thousands of Taiwan dollars to buy a new driving recorder, and an existing manufacturer often accompanies its public cloud and charges for cloud storage, which raises a privacy issue.

More importantly, if a vehicle owner does not want to replace the existing device, the vehicle owner must frequently insert and remove a flash card for a video that the vehicle owner wants to record. However, the driving recorder is often mounted on a back of a rearview mirror or very close to a windshield, making it not convenient to insert and remove the flash card. Moreover, if the flash card is small, such as a Micro SD card or a TF card, because of its small size, it is easy to lose, so the vehicle owner would not be willing to use a regular backup video, except when the vehicle owner meets a major accident. In addition, for elders, who are not skilled at using electronic devices, it is an obstacle for them to press and lock an accident recording video in time to prevent a file from being cycled and overwritten.

In addition, in certain applications, there may be a situation where two different apparatuses share the same apparatus resources. Such requirements are often difficult in today's environment, so generally two processes or two threads are generated in an operating system of one apparatus to synchronize use of the same resource through scheduling, such as one is responsible for processing video record and storage and another one is responsible for processing upload data to public cloud.

But the above apparatus, which can produce two or more processes or threads, also tends to be expensive, requiring a large storage space (such as a flash memory) and a dynamic random access memory (DRAM), and a more complex operating system and powerful and expensive processor to handle both video and data uploads, such as GNU/Linux. But such condition is often costly.

In view of the above and other problems, there is a need for improvement of prior art.

SUMMARY

The purpose of the present invention is to provide a cloud storage expansion apparatus for a video recorder to solve the problem in the prior art.

Another purpose of the present invention is to provide a cloud storage expansion method of a video recorder to solve the problem in the prior art.

Another purpose of the present invention is to simulate a flash card of a video recorder, avoid a user from frequently inserting and removing the flash card of the video recorder, use an existing video recorder, and extend a remote backup function for the existing video recorder.

Another purpose of the present invention is to upload a video file data stored in a flash card to a cloud space and avoid overwriting an important image disk.

In order to achieve the above and other purposes, the present invention provides a cloud storage expansion apparatus for a video recorder, wherein the cloud storage expansion apparatus is removably connected to a flash card slot of a video recorder, the flash card slot has a communication interface communicating with the outside, and the cloud storage expansion apparatus comprises: a body, having a circuit board and a power supply component, wherein the power supply component is electrically connected to the circuit board to supply power; a flash card circuit unit, arranged on the circuit board, wherein the flash card circuit unit conforms to a data access specification of the flash card slot; a dummy card connector, electrically connected to the flash card circuit unit, wherein the dummy card connector is removably connected to the flash card slot so as to be electrically connected to the communication interface for the video recorder to store image file data to the flash card circuit unit; a wireless communication module, arranged on the circuit board, wherein the wireless communication module is used to be connected to a cloud space; a detection module, arranged on the circuit board to detect if there is an active access signal in the communication interface; and a controller, arranged on the circuit board and electrically connected to the flash card circuit unit, the wireless communication module and the detection module, wherein when it is detected that there is no active signal in the communication interface, the controller occupies an access right of the flash card circuit unit, the image file data in the flash card circuit unit is uploaded to the cloud space, and the access right is released after all the image file data in the flash card circuit unit is uploaded.

Preferably, the detection module has a collision detection unit, and during a period when the controller occupies the access right, the collision detection unit detects whether the video recorder occupies the access right; when it is detected that the video recorder occupies the access right, uploading of the image file data in the storage card circuit unit to the cloud space is immediately interrupted, and the occupied access right is released.

Preferably, the collision detection unit detects that the video recorder has occupied the access right by comparing a signal sent by the processor to the flash card circuit unit with a signal returned by the flash card circuit unit.

Preferably, if the controller has non-uploaded information, the controller uploads the corresponding image file data according to the non-uploaded files information, wherein the non-uploaded information is used to record the image file data that has not been uploaded within the flash card circuit unit.

Preferably, in the present invention, further comprised are as follows: an internal storage module, arranged on the circuit board and electrically connected to the controller, wherein the internal storage module has a solid state disk, wherein if the controller has uncopied information and information to be uploaded, the controller occupies the access right when it is detected that the access right is released by polling if the flash card circuit access signal is active; and the controller copies the uncopied video file data of the flash card circuit unit to the solid state disk according to the uncopied information, and uploads the non-uploaded video file data of the solid state disk to the cloud space according to the information to be uploaded, wherein the uncopied information is used to record the uncopied image file data in the flash card circuit unit, and the information to be uploaded is used to record the non-uploaded image file data in the solid state disk.

Preferably, the power supply component comprises: a battery, electrically connected to the circuit board; and a battery management chip or a battery management system (BMS), electrically connected to the battery, wherein the battery management chip is connected to an external power, through which the battery is charged; and the external power is supplied to the circuit board in bypass, or the external power is connected to the battery and then supplied to the circuit board in bypass through the battery.

Preferably, the wireless communication module is connected to a handheld mobile apparatus, and the handheld mobile apparatus is connected to the cloud space via mobile data on-line.

Preferably, the cloud space is a private cloud or a public cloud.

In addition, in order to achieve the above and other purposes, the present invention provides a cloud storage expansion method of a video recorder, wherein the cloud storage expansion method comprises: detecting whether there is an accessing by polling in the communication interface, wherein the accessing by polling means there is an active signal; if yes, returning to continuously detect whether there is an active signal in the communication interface; and if no, occupying, by a cloud storage expansion apparatus of the video recorder, an access right, uploading image file data of a flash card circuit unit to a cloud space, and releasing the access right after uploading all the image file data.

Preferably, the cloud storage expansion method of a video recorder, wherein the step of uploading image file data of a flash card circuit unit to a cloud space further comprises: during a period when the cloud storage expansion apparatus of the video recorder occupies the access right, detecting whether the video recorder occupies the access right; if not, returning for continuous detection; and if yes, stopping uploading the image file data of the flash card circuit unit to the cloud space, and releasing the occupied access right.

Preferably, the cloud storage expansion method of a video recorder, wherein the step of detecting whether the video recorder occupies the access right comprises: comparing a signal sent to the flash card circuit unit with a signal returned by the flash card circuit unit, judging that the video recorder has occupied the access right in case that the signal sent to the flash card circuit unit is different from the signal returned by the flash card circuit unit.

Preferably, the cloud storage expansion method of a video recorder, wherein the step of uploading video file data of a flash card circuit unit to a cloud space comprises: if there is not uploaded information, uploading the not uploaded video file data of the flash card circuit unit to the cloud space according to the non-uploaded information, wherein the non-uploaded information is used to record the image file data that has not been uploaded within the flash card circuit unit.

Preferably, the cloud storage expansion method of a video recorder, wherein the step of uploading image file data of a flash card circuit unit to a cloud space comprises: if there are uncopied information and information to be uploaded, copying the uncopied image file data of the flash card circuit unit to the solid state disk according to the uncopied information, and uploading the non-uploaded image file data of the solid state disk to the cloud space according to the information to be uploaded, wherein the uncopied information is used to record the uncopied image file data in the flash card circuit unit, and the information to be uploaded is used to record the non-uploaded image file data in the solid state disk.

Preferably, the cloud storage expansion method of a video recorder, wherein in the step of uploading to the cloud space, the step of copying the uncopied image file data of the flash card circuit unit to the solid state disk according to the uncopied information further comprises: during a period when the cloud storage expansion apparatus of the video recorder occupies the access right, detecting whether the video recorder occupies the access right; if not, performing continuous detection; and if yes, stopping copying the uncopied image file data of the flash card circuit unit to the solid state disk, and releasing the access right.

Preferably, in the cloud storage expansion method of a video recorder, the cloud space comprises a private cloud or a public cloud.

DESCRIPTION OF THE EMBODIMENTS

Regarding the terminology, "access" includes "read and write" and "read or write", including the terms usually used in the computer science.

Figure 1:
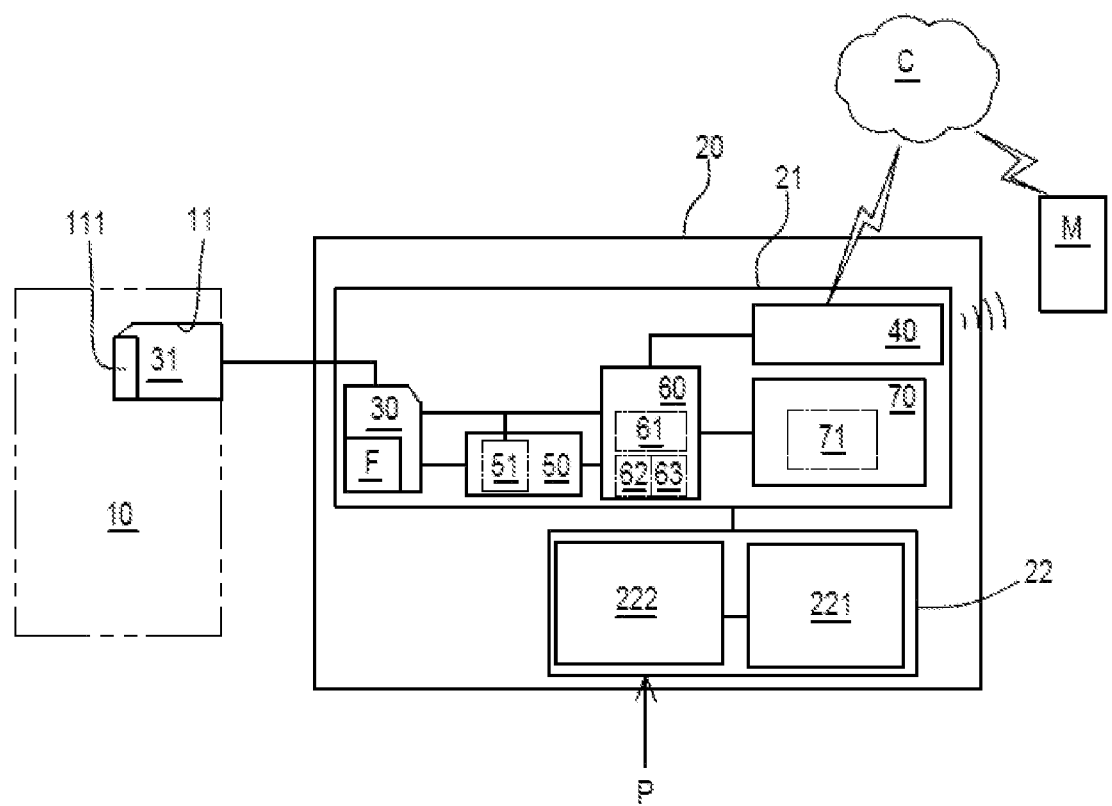
FIG. 1 is a system block diagram of a cloud storage expansion apparatus for a video recorder in an embodiment of the present invention.

FIG. 1 is a system block diagram of a cloud storage expansion apparatus for a video recorder in an embodiment of the present invention. See FIG. 1, the cloud storage expansion apparatus of the video recorder in this embodiment comprises a body 20, a flash card circuit unit 30, a dummy card connector 31, a wireless communication module 40, a detection module 50 and a controller 60, wherein the body 20 is provided with a circuit board 21 and a power supply component 22. The power supply component 22 is electrically connected to the circuit board 21 to supply power. The flash card circuit unit 30, the dummy card connector 31, the wireless communication module 40, the detection module 50 and the controller 60 are all electrically connected to the circuit board 21. The dummy card connector 31 is electrically connected with the flash card circuit unit 30 and extends from the body 20 and is inserted into a flash card slot 11 of a video recorder 10. The flash card slot 11 has a communication interface 111 (such as SD Bus or SPI Bus) that is capable of communicating with the outside. The dummy card connector 31 is electrically connected with the communication interface 111, so that the flash card circuit unit 30 is disguised as a flash card inserted into the flash card slot 11. Therefore, the video recorder 10 is capable of storing image file data F to the flash card circuit unit 30. The wireless communication module 40 communicates with a cloud space C to upload data in real time.

The detection module is used to detect whether there is an active signal in the communication interface 111. The controller 60 is electrically connected to the flash card circuit unit 30, the wireless communication module 40 and the detection module 50. When it is detected that the communication interface 111 has no active signal, the controller 60 occupies an access right of the flash card circuit unit 30 and uploads the image file data F in the flash card circuit unit 30 to the cloud space C, and the access right is released after all the image file data F within the flash card circuit unit 30 is uploaded.

Generally, the video recorder 10, such as a driving recorder, would transmit a control signal or data to the communication interface 111 for reading and writing the flash card during a powered on period thereof (or a recording period), and stop transmitting a control signal or data to the communication interface 111 when the video recorder 10 is shut down (or ends recording). Therefore, in this embodiment, when the detection module 50 detects that no active signal exists in any pin of the communication interface 111 in real time, the access right of the flash card circuit unit 30 can be determined to be released. At this time, the controller 60 can occupy the access right to read the flash card circuit unit 30 for a data operation such as copying. This monitoring process is very fast and short, which does not affect normal use of the video recorder 10.

In addition to the technical solution of monitoring the signal activity of the pin signal of communication interface 111 to confirm whether the video recorder 10 is using the flash card circuit unit 30, in another embodiment, it may also detect whether the video recorder 10 occupies the read/write right of the flash card thereof (that is, the flash card circuit unit 30). The read/write right is released when the video recorder 10 is shut down (or ends recording). In this embodiment, the detection module 50 detects an access right state of the flash card circuit unit 30 in real time, and continues with detection when the controller 60 detects, in real time, that the access right is not released (that is, the access right is occupied by the video recorder 10 and is in an unreleased state). When the access right is in a released state, the controller 60 occupies the access right, so as to upload the image file data F within the flash card circuit unit 30 to the cloud space C, and release the access right after all the image file data F within the flash card circuit unit 30 is uploaded. Although this method occupies hardware of the video recorder 10 for a slightly longer time than the aforementioned embodiment, it can still work without affecting the normal use of the video recorder 10.

Furthermore, for example, the signal could be detected its activity by polling before occupying the access right, and then by collision detect to decide the timing for stopping and releasing the access right.

Figure 2:
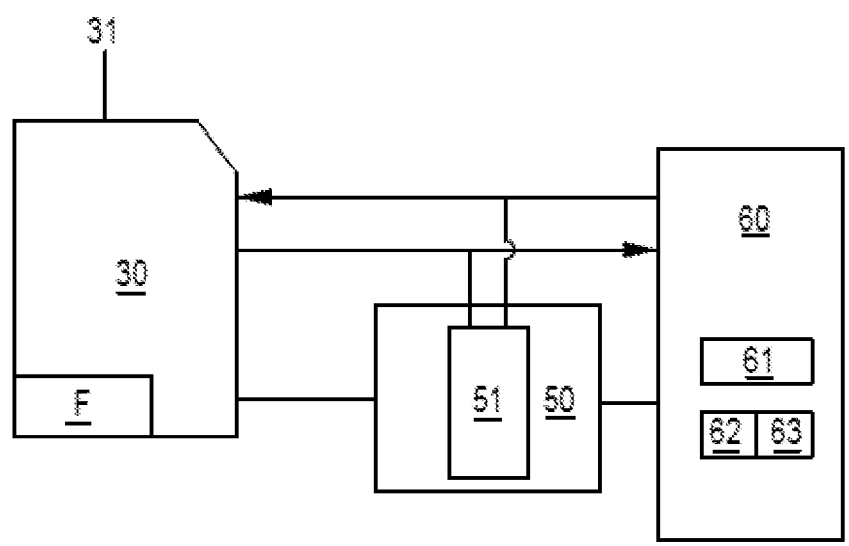
FIG. 2 is a system block diagram of a detection module and a collision detection unit in the embodiment of the present invention.

FIG. 2 is a system block diagram of a detection module and a collision detection unit in the embodiment of the present invention. See FIG. 2, it should be noted that the detection module 50 has a collision detection unit 51, wherein the collision detection unit 51 can detect whether the video recorder 10 occupies the access right during a period when the controller 60 occupies the access right. When it is detected that the video recorder 10 occupies the access right, the cloud storage expansion apparatus of the video recorder immediately interrupts uploading the image file data F within the flash card circuit unit 30 to the cloud space C, and releases the occupied access right to avoid the controller 60 occupying the access right. The video recorder 10 crashes because the video recorder 10 reads and writes the flash card circuit unit 30 at the same time.

In other words, the apparatus can only obtain the access right of flash card circuit unit 30 when the video recorder 10 does not occupy the access right of the flash card, or even when the video recorder 10 is shut down, and copy and upload data in the flash card circuit unit 30 to the cloud space C as soon as possible. However, during the period when the apparatus occupies the access right, starting the collision detection unit 51 to detect whether the video recorder 10 needs to use the flash card circuit unit 30. When the collision detection unit 51 detects that the video recorder 10 is occupying the flash card circuit unit 30, the access right should be released as soon as possible, so as not to affect the operation of the video recorder 10.

The above manner of detecting that the video recorder 10 occupies the flash card circuit unit 30 is to use a collision detection similar to that of Ethernet. When the video recorder 10 needs to use the flash card circuit unit 30, it would occupy the access right of the flash card circuit unit 30, so that a signal of pin of the flash card circuit unit 30 is different from a signal in the state where the access right is released. Therefore, preferably, the collision detection unit 51 is provided in the detection module 50. The collision detection unit 51 compares a signal sent by the processor 60 to the flash card circuit unit 30 with a signal returned by the flash card circuit unit. If there is any difference, it can be determined that the video recorder 10 has occupied the access right of the flash card circuit unit 30. At this time, the apparatus should return the occupied access right of flash card circuit unit 30 as soon as possible, so as not to hinder the normal operation of the video recorder 10. The time from detecting a change of the signal to releasing the access right is very short, such as a few microseconds (μs), without affecting the video recorder 10.

Preferably, the controller 60 can maintain non-uploaded information 61 to record the image file data F of which the flash card circuit unit 30 may interrupt the upload for some reason and has not completed the upload. In this way, the controller 60 can upload the image file data F according to the non-uploaded information 61. That is, it is not necessary to upload all the image file data F within the flash card circuit unit 30 every time, but only to upload an unsuccessful and newly added file, which can upload the image file data F within the flash card circuit unit 30 more efficiently without repeating. In other words, the non-uploaded information 61 can record whether a source end of an upload program (such as the flash card circuit unit 30) is not successfully backed up to a destination end (such as the cloud space C), as the basis for the next uploading.

Preferably, if the controller 60 has non-uploaded information 61, the controller 60 uploads the corresponding image file data according to the non-uploaded information 61.

See FIG. 1 again, preferably, the circuit board 21 may further comprise an internal storage module 70 electrically connected to the controller 60. The internal storage module 70 has a solid state disk 71. When the access right is detected to be released, the controller 60 would occupy the read right to copy the image file data F of the flash card circuit unit 30 to the solid state disk 71, and upload the image file data F of the solid state disk 71 to the cloud space C. The above copying and uploading can be carried out in sequence, or in parallel, that is, copying a file while uploading another file.

Furthermore, in order to be more efficiently, the image file data F within the flash card circuit unit 30 is copied and uploaded without repetition. In an embodiment, the controller 60 has uncopied information 62 and information to be uploaded 63. The uncopied information 62 records the image file data F which is within the flash card circuit unit 30 and has not been copied to the solid state disk 71. When the access right is detected to be released, the controller 60 occupies the access right, so as to copy the uncopied image file data F of the flash card circuit unit 30 to the solid state disk 71 according to the uncopied information 62, and upload the non-uploaded image file data F of the solid state disk 71 to the cloud space C according to the information to be uploaded 63. In other words, the uncopied information 62 can record whether the source end of upload program (such as the flash card circuit unit 30) is not successfully backed up to the destination end (such as the solid state disk 71), as the basis for the next copying. The information to be uploaded 63 can record whether the source end of upload program (such as the solid state disk 71) is not backed up to the destination end (such as the cloud space C), as the basis for the next uploading.

In an embodiment, the power supply assembly 22 may comprise a battery 221 and a battery management chip 222, wherein the battery 221 may be charged via the battery management chip 222 by an external power P, such as an automotive power supply or a mobile power supply, so that the battery 221 supplies power to the circuit board 21. The battery management chip 222 can also supply the external power P to the circuit board 21 in bypass, or connect the external power P to the battery 221 and then the battery 221 supply power in bypass, so as to provide the circuit board 21 with two power supply modes; supplying power by the battery or supplying power by the external power supply.

In an embodiment, the flash card circuit unit 30 may be a virtual flash card circuit, or a physical flash card circuit may be welded directly into the circuit board 21.

In an embodiment, a communication technology with which the wireless communication module 40 is connected to outside comprises Wi-Fi, LTE or 5G. In addition, the wireless communication module 40 can directly connect to the cloud space C or connect to the cloud space C through mobile data of a handheld mobile apparatus M. The cloud space C can be a public cloud, or a private cloud with more privacy protection.

Figure 3:
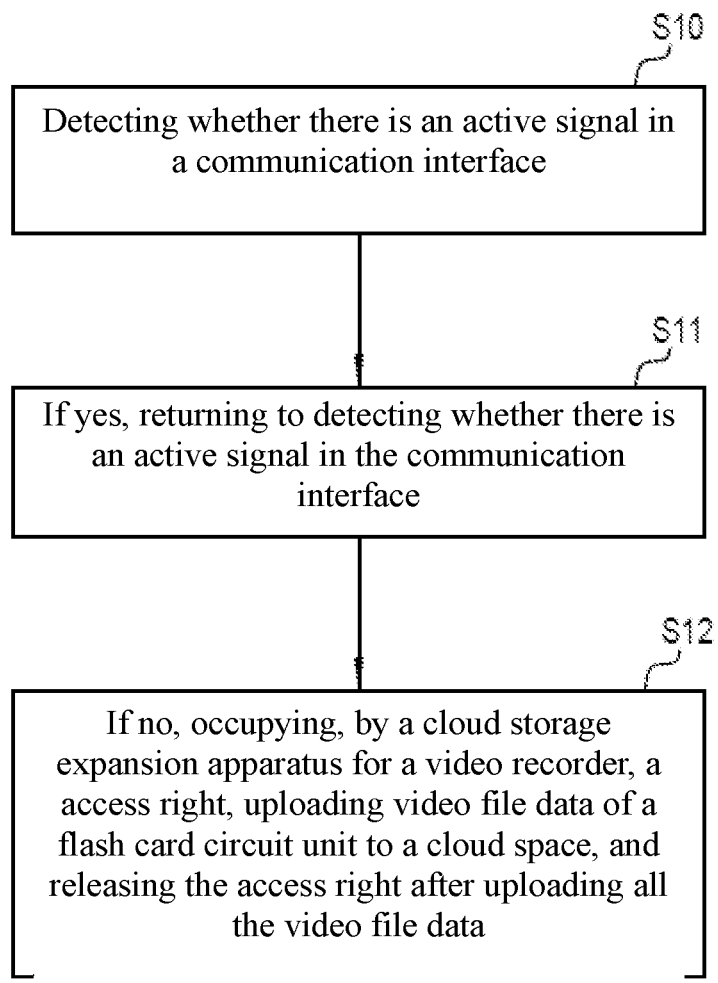
FIG. 3 is a flow chart of a cloud storage expansion method of a video recorder in an embodiment of the present invention.

FIG. 3 is a cloud storage expansion method of a video recorder in an embodiment of the present invention. See FIG. 3, preferably, this method comprises steps S10 to S12. Step S10, detecting whether there is an active signal in a communication interface 111. Step S11, if yes, returning to detecting whether there is an active signal in the communication interface 111. Step S12, if no, occupying, by the cloud storage expansion apparatus of the video recorder, a access right, uploading image file data F of a flash card circuit unit 30 to a cloud space C, and releasing the access right after uploading all the image file data F.

Figure 4:
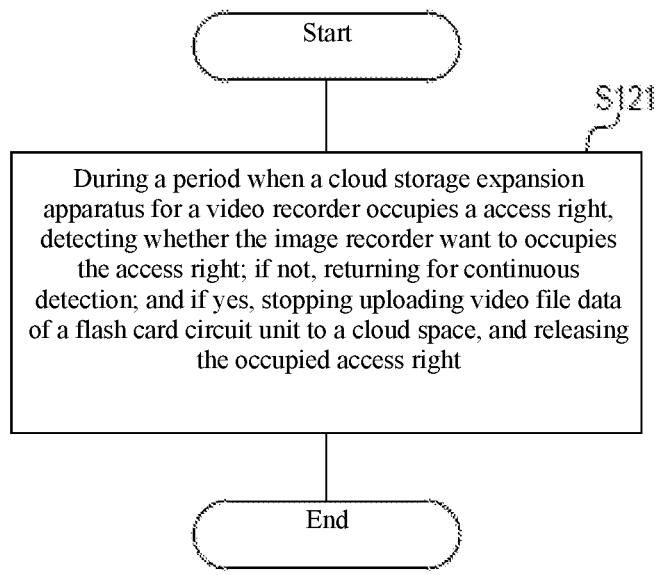
FIG. 4 is a flow chart of detecting an access right during occupation of the access right by the cloud storage expansion apparatus of the video recorder in the embodiment of the present invention in FIG. 3.

FIG. 4 is a cloud storage expansion method of a video recorder in another embodiment of the present invention. See FIG. 4, step S12 further comprises: S121, during a period when the cloud storage expansion apparatus of the video recorder occupies the access right, detecting whether the video recorder 10 occupies the access right; if not, returning for continuous detection; and if yes, stopping uploading the image file data F of the flash card circuit unit 30 to the cloud space C, and releasing the occupied access right, so as to avoid system crash of the video recorder 10 caused by occupying the flash card circuit unit 30 in the present invention.

Figure 5:
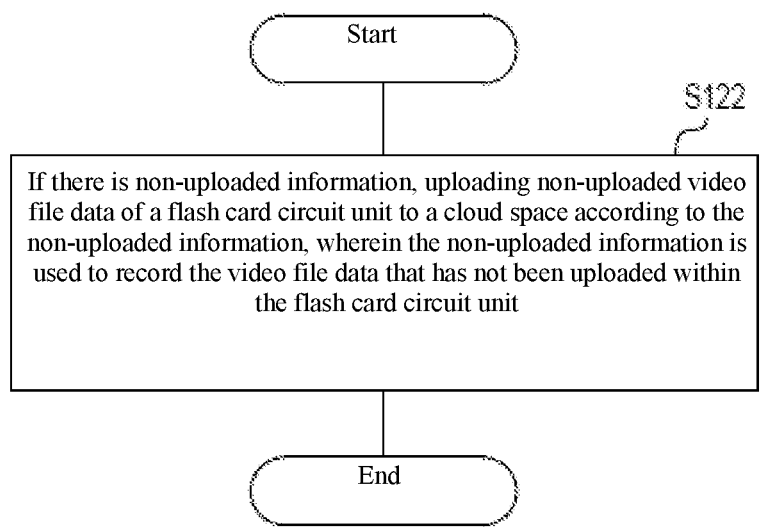
FIG. 5 is a flow chart of detecting an access right during occupation of the access right by the cloud storage expansion apparatus of the video recorder in another embodiment of the present invention in FIG. 3.

FIG. 5 is a flow chart of detecting that the video recorder occupies the reading and writing right in another embodiment during the occupation of the reading and writing right in the present invention in FIG. 3. In the embodiment of this method, the non-uploaded information 61 can be applied to record the non-uploaded image file data within the flash card circuit unit 30, so that the upload program can be executed according to the non-uploaded information 61 during the uploading. In other words, step S12 further comprises: step S122, if there is non-uploaded information, uploading non-uploaded image file data of a flash card circuit unit to a cloud space according to the non-uploaded information, wherein the non-uploaded information is used to record the image file data F that has not been uploaded within the flash card circuit unit 30, thus avoiding uploading all image file data F within the flash card circuit unit every time, which cannot improve uploading efficiency.

Figure 6:
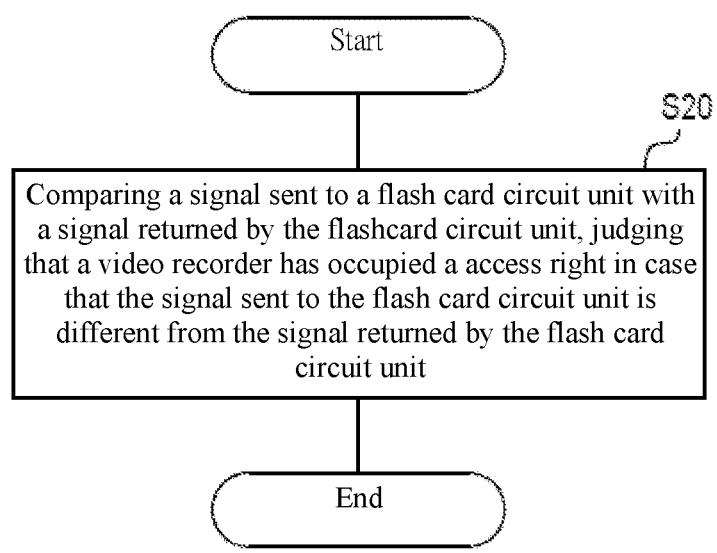
FIG. 6 is a flow chart of a collision detection method for a cloud storage expansion method of a video recorder in the present invention.

FIG. 6 is a flow chart of a collision detection method for a cloud storage expansion method of a video recorder in the present invention. See FIG. 6, the step of detecting whether the video recorder occupies the access right comprises: step S20, comparing a signal sent to the flash card circuit unit 30 with a signal returned by the flash card circuit unit, judging that the video recorder 10 has occupied the access right in case that the signal sent to the flash card circuit unit is different from the signal returned by the flash card circuit unit.

Figure 7:
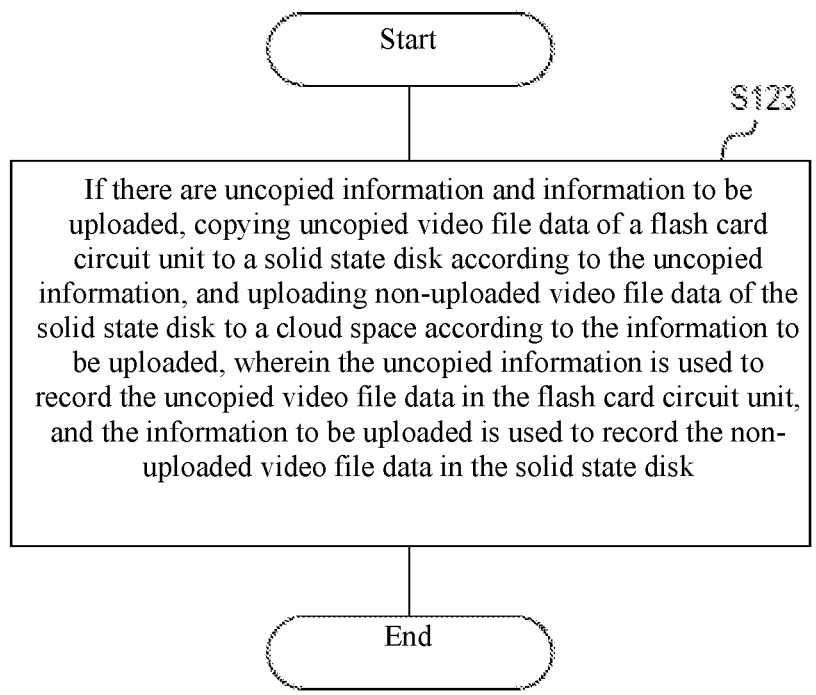
FIG. 7 is a flow chart of detecting an access right during occupation of the access right by the cloud storage expansion apparatus of the video recorder having a solid state disk embodiment in the present invention.

FIG. 7 is a flow chart of detecting that the video recorder occupies the reading and writing right in another embodiment during the occupation of the reading and writing right in the present invention. See FIG. 7, step S12 further comprises: step S123, if there are uncopied information 62 and information to be uploaded 63, copying the uncopied image file data F of the flash card circuit unit 30 to the solid state disk 71 according to the uncopied information 62, and uploading the non-uploaded image file data F of the solid state disk 71 to the cloud space C according to the information to be uploaded 63, so as to improve the uploading efficiency. In the preceding step, the uncopied information 62 is used to record the uncopied image file data F within the flash card circuit unit 63, and the information to be uploaded 63 is used to record the non-uploaded image file data within the solid state disk 71.

Figure 8:
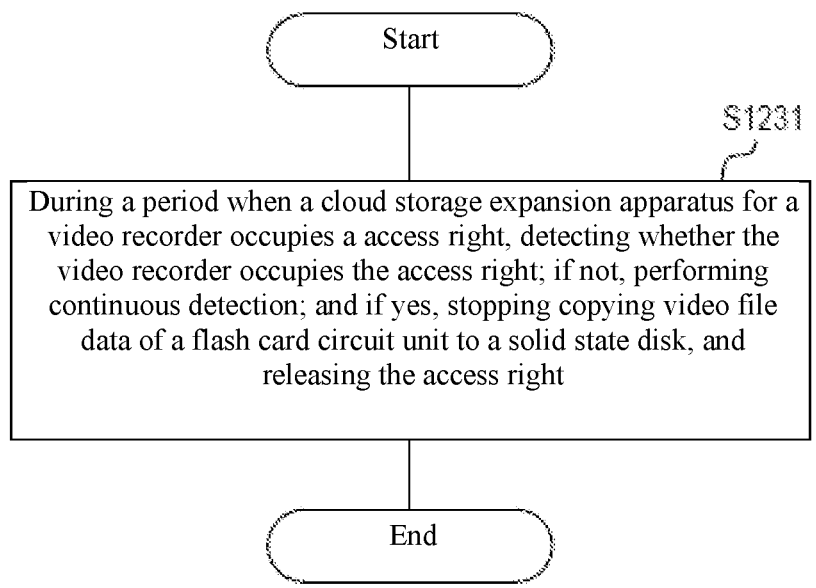
FIG. 8 is a sub-step of the embodiment in FIG. 7.

FIG. 8 is a sub-step of the embodiment in FIG. 7. See FIG. 7 and FIG. 8, preferably, step S123 further comprises: step S1231: during the period when the cloud storage expansion apparatus of the video recorder occupies the access right, detecting whether the video recorder occupies the access right; if not, performing continuous detection; if yes, stopping copying the uncopied image file data of the flash card circuit unit 30 to the solid state disk, and releasing the access right, so that if the cloud storage expansion apparatus of the video recorder has the solid state disk 71, during the period when the cloud storage expansion apparatus of the video recorder occupies the access right, when the video recorder 10 is detected to occupy the access right, interrupting the copying operation of the flash card circuit unit 30, and returning the access right to the video recorder 10. However, the procedure for uploading the image file data F of solid state disk 71 continues without being affected until all the image file data F of solid state disk 71 has been uploaded, so as to improve the efficiency of copying and uploading.

In summary, in the embodiment of the present invention, the flash card circuit unit and the dummy card connector are used to simulate a dummy flash card, and the dummy flash card is connected to the flash card slot of the existing video recorder, so that it can detect that there is no signal activity of the communication interface between the dummy flash card and the outside in real time or when the reading and writing right of the dummy flash card is released, the operation of reading, uploading or uploading after copying the file of the dummy flash card is carried out, which can achieve the effect of remote storage or backup without disturbing the normal operation of the video recorder, and can avoid frequent insertion and removal of the flash card of the video recorder.

DESCRIPTION OF REFERENCE NUMBERS

Video recorder (10)
Flash card slot (11)
Communication interface (111)
Body (20)
Circuit board (21)
Power supply component (22)
Battery (221)
Battery management chip (222)
Flash card circuit unit (30)
Dummy card connector (31)
Wireless communication module (40)
Detection module (50)
Collision detection unit (51)
Controller (60)
Non-uploaded information (61)
Uncopied information (62)
Information to be uploaded (63)
Internal storage module (70)
Solid state disk (71)
Cloud space (C)
Image file data (F)
Handheld mobile apparatus (M)
Step (S10)
Step (S11)
Step (S12)
Step (S121)
Step (S122)
Step (S123)
Step (S1231)
Step (S20)

The invention claimed is:

1. A cloud storage expansion apparatus for a video recorder, wherein the cloud storage expansion apparatus is removably connected to a flash card slot of a video recorder, the flash card slot has a communication interface communicating with the outside, and the cloud storage expansion apparatus comprises:
a body, having a circuit board and a power supply component, wherein the power supply component is electrically connected to the circuit board to supply power;
a flash card circuit unit, arranged on the circuit board, wherein the flash card circuit unit conforms to a data access specification of the flash card slot;
a dummy card connector, electrically connected to the flash card circuit unit, wherein the dummy card connector is removably connected to the flash card slot so as to be electrically connected to the communication interface for the video recorder to store image file data to the flash card circuit unit;
a wireless communication module, arranged on the circuit board, wherein the wireless communication module is used to be connected to a cloud space;
a detection module, arranged on the circuit board to detect whether there is an active signal in the communication interface; and
a controller, arranged on the circuit board and electrically connected to the flash card circuit unit, the wireless communication module and the detection module, wherein when it is detected that there is no active signal in the communication interface, the controller occupies a an access right of the flash card circuit unit, the image file data in the flash card circuit unit is uploaded to the cloud space, and the access right is released after all the image file data in the flash card circuit unit is uploaded.

2. The cloud storage expansion apparatus for a video recorder according to claim 1, wherein the detection module has a collision detection unit, and during a period when the controller occupies the access right, the collision detection unit detects whether the video recorder occupies the access right; when it is detected that the video recorder occupies the access right, uploading of the image file data in the storage card circuit unit to the cloud space is immediately interrupted, and the occupied access right is released.

3. The cloud storage expansion apparatus for a video recorder according to claim 2, wherein the collision detection unit detects that the video recorder has occupied the access right by comparing a signal sent by the processor to the flash card circuit unit with a signal returned by the flash card circuit unit.

4. The cloud storage expansion apparatus for a video recorder according to claim 2, wherein if the controller has non-uploaded information, the controller uploads the corresponding image file data according to the non-uploaded information, wherein the non-uploaded information is used to record the image file data that has not been uploaded within the flash card circuit unit.

5. The cloud storage expansion apparatus for a video recorder according to claim 2, further comprises:
an internal storage module, arranged on the circuit board and electrically connected to the controller, wherein the internal storage module has a solid state disk,
wherein if the controller has uncopied information and information to be uploaded, the controller occupies the access right when it is detected that the access right is released; and the controller copies the uncopied image file data of the flash card circuit unit to the solid state disk according to the uncopied information, and uploads the non-uploaded image file data of the solid state disk to the cloud space according to the information to be uploaded, wherein the uncopied information is used to record the uncopied image file data in the flash card circuit unit, and the information to be uploaded is used to record the non-uploaded image file data in the solid state disk.

6. The cloud storage expansion apparatus for a video recorder according to claim 2, wherein the power supply component comprises:
a battery, electrically connected to the circuit board; and
a battery management chip, electrically connected to the battery, wherein the battery management chip is connected to an external power, through which the battery is charged; and the external power is supplied to the circuit board in bypass, or the external power is connected to the battery and then supplied to the circuit board in bypass through the battery.

7. The cloud storage expansion apparatus for a video recorder according to claim 2, wherein the flash card circuit unit is a physical or virtual flash card circuit.

8. The cloud storage expansion apparatus for a video recorder according to claim 2, wherein the wireless communication module is connected to a handheld mobile apparatus, and the handheld mobile apparatus is connected to the cloud space via mobile data on-line.

9. The cloud storage expansion apparatus for a video recorder according to claim 1 wherein if the controller has non-uploaded information, the controller uploads the corresponding image file data according to the non-uploaded information, wherein the non-uploaded information is used to record the image file data that has not been uploaded within the flash card circuit unit.

10. The cloud storage expansion apparatus for a video recorder according to claim 1, further comprises:
an internal storage module, arranged on the circuit board and electrically connected to the controller, wherein the internal storage module has a solid state disk,
wherein if the controller has uncopied information and information to be uploaded, the controller occupies the access right when it is detected that the access right is released; and the controller copies the uncopied image file data of the flash card circuit unit to the solid state disk according to the uncopied information, and uploads the non-uploaded image file data of the solid state disk to the cloud space according to the information to be uploaded, wherein the uncopied information is used to record the uncopied image file data in the flash card circuit unit, and the information to be uploaded is used to record the non-uploaded image file data in the solid state disk.

11. The cloud storage expansion apparatus for a video recorder according to claim 1, wherein the power supply component comprises:
a battery, electrically connected to the circuit board; and
a battery management chip, electrically connected to the battery, wherein the battery management chip is connected to an external power, through which the battery is charged; and the external power is supplied to the circuit board in bypass, or the external power is connected to the battery and then supplied to the circuit board in bypass through the battery.

12. The cloud storage expansion apparatus for a video recorder according to claim 1, wherein the flash card circuit unit is a physical or virtual flash card circuit.

13. The cloud storage expansion apparatus for a video recorder according to claim 1, wherein the wireless communication module is connected to a handheld mobile apparatus, and the handheld mobile apparatus is connected to the cloud space via mobile data on-line.

14. The cloud storage expansion apparatus for a video recorder according to claim 1, wherein the cloud space is a private cloud or a public cloud.

15. A cloud storage expansion method of a video recorder, wherein the cloud storage expansion method comprises:
detecting whether there is an active signal in the communication interface;
if yes, returning to continuously detect whether there is an active signal in the communication interface; and
if no, occupying, by a cloud storage expansion apparatus of the video recorder, a access right, uploading image file data of a flash card circuit unit to a cloud space, and releasing the access right after uploading all the image file data.

16. The cloud storage expansion method of a video recorder according to claim 15, wherein the step of uploading image file data of a flash card circuit unit to a cloud space further comprises:
during a period when the cloud storage expansion apparatus of the video recorder occupies the access right, detecting whether the video recorder occupies the access right; if not, returning for continuous detection; and if yes, stopping uploading the video file data of the flash card circuit unit to the cloud space, and releasing the occupied access right.

17. The cloud storage expansion method of a video recorder according to claim 16, wherein the step of detecting whether the video recorder occupies the access right comprises:
comparing a signal sent to the flash card circuit unit with a signal returned by the flash card circuit unit, judging that the video recorder has occupied the access right in case that the signal sent to the flash card circuit unit is different from the signal returned by the flash card circuit unit.

18. The cloud storage expansion method of a video recorder according to claim 15, wherein the step of uploading image file data of a flash card circuit unit to a cloud space comprises:
if there is non-uploaded information, uploading the non-uploaded image file data of the flash card circuit unit to the cloud space according to the non-uploaded information, wherein the non-uploaded information is used to record the video file data that has not been uploaded within the flash card circuit unit.

19. The cloud storage expansion method of a video recorder according to claim 15, wherein the step of uploading image file data of a flash card circuit unit to a cloud space comprises:
if there are uncopied information and information to be uploaded, copying the uncopied video file data of the flash card circuit unit to the solid state disk according to the uncopied information, and uploading the non-uploaded image file data of the solid state disk to the cloud space according to the information to be uploaded, wherein the uncopied information is used to record the uncopied image file data in the flash card circuit unit, and the information to be uploaded is used to record the non-uploaded image file data in the solid state disk.

20. The cloud storage expansion method of a video recorder according to claim 19, wherein in the step of uploading to the cloud space, the step of copying the uncopied image file data of the flash card circuit unit to the solid state disk according to the uncopied information further comprises:
during a period when the cloud storage expansion apparatus of the video recorder occupies the access right, detecting whether the video recorder occupies the access right; if not, performing continuous detection; and if yes, stopping copying the uncopied image file data of the flash card circuit unit to the solid state disk, and releasing the access right.

* * * * *